(12) United States Patent
Shaw, Jr. et al.

(10) Patent No.: US 6,755,345 B2
(45) Date of Patent: Jun. 29, 2004

(54) GOLF HANDICAP SMART CARD SYSTEM

(75) Inventors: John L. Shaw, Jr., Fort Washington, MD (US); Paul Garrett, Darnestown, MD (US); Paul R. Ruane, Pawleys Island, SC (US)

(73) Assignee: Golf Reporting Solutions, LLC, Fort Washington, MD (US)

( * ) Notice: Subject to any disclaimer, the term of this patent is extended or adjusted under 35 U.S.C. 154(b) by 0 days.

(21) Appl. No.: 10/191,545

(22) Filed: Jul. 10, 2002

(65) Prior Publication Data

US 2004/0007617 A1 Jan. 15, 2004

(51) Int. Cl.$^7$ .............................................. G06K 19/06
(52) U.S. Cl. ..................................... 235/492; 235/486
(58) Field of Search ............................... 235/492, 486, 235/441, 375, 376, 380, 382; 473/409, 407, 131

(56) References Cited

U.S. PATENT DOCUMENTS

| | | | |
|---|---|---|---|
| 4,874,935 A | * 10/1989 | Younger ...................... | 235/492 |
| 5,293,424 A | * 3/1994 | Holtey et al. ................ | 713/193 |
| 5,504,312 A | 4/1996 | Morrison et al. ............ | 235/375 |
| 5,507,485 A | * 4/1996 | Fisher ......................... | 473/407 |
| 5,562,550 A | 10/1996 | Chartrand .................... | 473/131 |
| 5,779,549 A | 7/1998 | Walker et al. ................. | 463/42 |
| 5,883,377 A | 3/1999 | Chapin, Jr. ................... | 235/493 |
| 5,970,143 A | * 10/1999 | Schneier et al. ............. | 713/181 |
| 6,024,286 A | 2/2000 | Bradley et al. .............. | 235/492 |
| 6,074,312 A | * 6/2000 | Lyon et al. ................... | 473/409 |
| 6,089,459 A | 7/2000 | Eisele et al. ................. | 235/492 |
| 6,138,917 A | 10/2000 | Chapin, Jr. ................... | 235/487 |
| 6,246,917 B1 | * 6/2001 | Smith et al. ................... | 700/92 |
| 6,315,207 B1 | 11/2001 | Eisele et al. ................. | 235/492 |
| 6,325,291 B1 | 12/2001 | Eisele et al. ................. | 235/487 |
| 6,340,117 B1 | 1/2002 | Eisele et al. ................. | 235/492 |

FOREIGN PATENT DOCUMENTS

WO    WO 97/02873    1/1997

* cited by examiner

Primary Examiner—Thien M. Le

(57) ABSTRACT

A golf handicap smart card system including at least one golf handicap smart card, at least one golf handicap smart card reader, and a golf handicap web site accessible by qualified users, wherein a qualified user has a current verifiable golf handicap with them at all times and available for peer review.

28 Claims, 3 Drawing Sheets

GOLF HANDICAP SMART CARD SYSTEM

BACKGROUND OF THE INVENTION

1. Field of the Invention

The present invention relates generally to a golf handicap system and, more particularly to a golf handicap smart card system.

2. Description of the Related Art

Golf is a very popular worldwide sport. In the United States, since 1912, the United States Golf Association (USGA) Handicap System has made it possible for golfers of differing abilities to enjoy fair competition. The USGA Handicap System utilizes Handicap Indexes which are issued by golf clubs which follow all of the procedures established in the USGA Handicap System. Golfers must get handicaps through golf clubs to ensure fairness through "peer review" that assures reliability of the USGA Handicap System.

Each hole of a golf course may include a tee off area having a number of different tee markers, a fairway, a rough, a putting green, and a pin located in a cup on the putting green. Each hole may also include various hazards such as sand traps, water hazards, bunkers, trees, etc. Each golfer records on a scorecard the number of times required to hit a golf ball from one of the tee markers into the cup on the putting green for each hole. After all of the holes on a course are completed, the golfer tallies the score for each hole and records a total score for the course, with appropriate adjustments. The golfer then submits this total score to the golf club. The golf club posts the total score for the course in accordance with a variety of factors, such as the golfer's USGA Handicap Index, the Course Rating, the Slope Rating, etc. The golf club then periodically (e.g., monthly or the like) determines the golfer's handicap by utilizing an authorized USGA handicap algorithm. Individual golfer scores then become available for peer review by committee. The golfer's handicap is a score calculated by using the ten best scores out of the last twenty golf games played by the golfer (tournament scores will impact this calculation and could increase the number of scores up to thirty)

Golf has become so popular that USGA membership has shifted from the ratio of 90% private 10% public to today where the USGA public membership is over 60%. These public golfers do not have a system to have a true verifiable handicap. As the trend in golf rounds played moves from private club rounds to public and semi-private rounds, the use of Internet handicap posting has led to the diminishment of peer review as a function of the present handicap system. In many instances public golfers have only the Internet to maintain a golf handicap, which requires individual golfers to maintain their own handicap without peer review. Many times public golfers still have to retain their own score cards from their rounds even if the golfer has an Internet handicap. This is because under any system available for public golfers now proposed, the peer review requirement of the USGA is not fully met.

Therefore, there is a need to bring the USGA Handicap System into the 21st century by enabling a golfer to have a current verifiable golf handicap on their person at all times for peer review. The related art is represented by the following references of interest.

U.S. Pat. No. 5,504,312, issued on Apr. 2, 1996 to Anthony J. Morrison et al., describes a scoring system for compiling a set of statistics based on a given set of sports and/or performance events and/or activities data. Morrison et al. does not suggest a golf handicap smart card system according to the claimed invention.

U.S. Pat. No. 5,562,550, issued on Oct. 8, 1996 to Victor Chartrand, describes a computerized golf handicap system capable of storing all of a golfer's pertinent information that can be read remotely by a computer without any physical contact with the computer system such that all of the pertinent information is automatically entered into the computer. Chartrand does not suggest a golf handicap smart card system according to the claimed invention.

U.S. Pat. No. 5,779,549, issued on Jul. 14, 1998 to Jay S. Walker et al., describes a distributed electronic tournament system in which many remotely located players participate in a tournament through input/output devices connected to a central controller which manages the tournament. Walker et al. does not suggest a golf handicap smart card system according to the claimed invention.

U.S. Pat. No. 5,883,377, issued on Mar. 16, 1999 to Stephen R. Chapin, Jr., describes magnetic stripe transaction cards usable with currently installed conventional reading and processing systems. Chapin, Jr. '377 does not suggest a golf handicap smart card system according to the claimed invention.

U.S. Pat. No. 6,024,286, issued on Feb. 15, 2000 to James F. Bradley et al., describes a smart card system that offers a plurality of different accounts on the smart card. Bradley et al. does not suggest a golf handicap smart card system according to the claimed invention.

U.S. Pat. No. 6,074,312, issued on Jun. 13, 2000 to Lawrence G. Lyon et al., describes systems and methods for the calculation and maintenance of a golfer's handicap index. Lyon et al. employs a card that only stores handicap index information and displays the index on the card. The card does not process any data or execute any calculations. Lyon et al. does not provide the ability of an individual golfer to have a current verifiable golf handicap on their person at all times. Lyon et al. does not suggest a golf handicap smart card system according to the claimed invention.

U.S. Pat. Nos. 6,089,459, 6,315,207 B1, 6,325,291 B1, and 6,340,117 B1, issued on Jul. 18, 2000, Nov. 13, 2001, Dec. 4, 2001, and Jan. 22, 2002, respectively, to Raymond Eisele et al., describe a smart diskette device, not a smart card, adaptable to receive electronic medium. Eisele et al. '459, '207, '291, and '117 do not suggest a golf handicap smart card system according to the claimed invention.

U.S. Pat. No. 6,138,917, issued on Oct. 31, 2000 to Stephen R. Chapin, Jr., describes multiple magnetic stripe transaction cards and systems for the utilization thereof. Chapin, Jr. '917 does not suggest a golf handicap smart card system according to the claimed invention.

U.S. Pat. No. 6,246,917 B1, issued on Jun. 12, 2001 to Kenneth D. Smith et al., describes electronic scorekeeping wherein a smart card is employed to facilitate the keeping of a detailed record of play and other comparative information. Smith et al. does not suggest a golf handicap smart card system according to the claimed invention.

International Patent document WO 97/02873, published on Jan. 30, 1997, describes a personal golf performance system. International '873 does not suggest a golf handicap smart card system according to the claimed invention.

None of the above inventions and patents, taken either singularly or in combination, is seen to describe the instant invention as claimed. Thus a golf handicap smart card system solving the aforementioned problems is desired.

SUMMARY OF THE INVENTION

The present invention is a golf handicap smart card system. The golf handicap smart card system includes at least one golf handicap smart card, at least one golf handicap smart card reader, and a golf handicap web site.

The golf handicap smart card system includes at least one golf handicap smart card. The golf handicap smart card is a plastic card embedded with a computer chip that calculates, stores personal information and past history, and transacts data between the golf handicap smart card and the golf handicap smart card readers. This data is associated with either value or information or both and is stored and processed within the golf handicap smart card's chip.

The golf handicap smart card may be a contact card, a combination card, or a contactless card. The golf handicap smart card may include a microprocessor, a read only memory, a random access memory, a nonvolatile memory, and a card reader interface. A combination or contactless card may also include a transceiver and an antenna to enable transfer of data via a wireless link. These cards may also include an encryption methodology device to provide security to the data on the card.

The golf handicap smart card has on-card dynamic data processing capabilities and allocates the card memories into independent sections assigned to a specific function or application. Application programs/logic manage the memory allocation and file access. The application programs/logic manage data in organized file structures via golf handicap smart card software and/or application programs. The application programs/logic control access to the memories. This capability permits different and multiple functions and/or different application programs/logic to reside on the golf handicap smart card.

The golf handicap smart card reader is a self-contained processing device/application. The golf handicap smart card reader may read and write to the golf handicap smart card. The golf handicap smart card reader may include memory and a microprocessor to store application logic or programs. The golf handicap smart card reader may interface to the golf handicap web site/database via any known technique. The golf handicap smart card reader may include a modem to provide communication with the golf handicap web site over the Internet via a telephone line. The golf handicap smart card reader may have input keys or buttons to enable a user to input information. The golf handicap smart card reader may also include a display, such as a cathode ray tube display, a liquid crystal display, a light emitting diode display, a plasma display, a plasma addressing liquid crystal display, a thin film transistor display, a field emission display, or the like, to enable a user to observe information that is being read or written to a golf handicap smart card.

The golf handicap smart card reader may have a printer to print out a paper that includes the golfer's name, the current USGA handicap index, the conversion from the index to the handicap for that individual golf course, and the appropriate set of tees. The printer may also print out a paper that includes all rounds of golf stored on the golf handicap smart card. The memory of the golf handicap smart card reader will include information applicable to the particular course where the golf handicap smart card reader is currently located. The information may include the required slope and course rating for all sets of tees. Appropriate information may be input or loaded when a golf handicap smart card reader is initially delivered to a course.

The golf handicap web site may store a record of the handicaps of individual golfers. At the end of each day individual golf courses affiliated with the golf handicap web site may upload the golfer rounds to the golf handicap web site. Qualified users with Internet access may view appropriate individual participant's handicap. The golf scores may be read only files so individual golfer's may not change or record a score on the golf handicap web site. Each golf club or course that has an affiliation with the golf handicap web site may be given a passcode to either the chairperson of the handicap committee or the individual responsible for the maintenance of handicaps to allow corrections of posting mistakes. The golf handicap web site may have formulas or methods for the setting up of tournaments such as best ball foursomes or twosomes, scramble events, calloway, match play, medal play, or any event conducted by the individual golf clubs. The golf handicap web site may have interactive areas where a golfer can graph their progress, keep putting greens and fairways hit in regulation statistics, keep track of matches won and lost, or the like.

The golf handicap smart card, the golf handicap smart card reader, and the golf handicap web site each include respective software code stored in their respective memories. More particularly, the golf handicap smart card includes golf handicap smart card software code stored in the golf handicap smart card memory, the golf handicap smart card reader includes golf handicap smart card reader software code stored in the golf handicap smart card reader memory, and the golf handicap web site includes golf handicap web site software code stored in the golf handicap web site server.

The golf handicap smart card software code includes golf handicap smart card application programs/logic code. The golf handicap smart card application programs/logic code enables the golf handicap smart card to communicate with a golf handicap smart card reader via any known interfacing protocol, to transfer data to a handicap smart card reader, and to receive data from a handicap smart card reader. The golf handicap smart card application programs/logic code carries out operations on data received and stored on the golf handicap smart card. These operations include utilizing stored USGA handicap algorithms to calculate a current handicap based on data received and/or stored on the golf handicap smart card.

The golf handicap smart card reader software code includes golf handicap smart card reader application code. The golf handicap smart card reader application code enables the golf handicap smart card reader to communicate with a golf handicap smart card via any known interfacing protocol, to transfer data to a handicap smart card, to receive data from a handicap smart card, to communicate with the golf handicap web site, to transfer data to the handicap web site, and to receive data from the handicap web site. The golf handicap smart card reader application code carries out operations on data received and stored on the golf handicap smart card reader.

The golf handicap web site software code includes golf handicap web site application code. The golf handicap web site application code enables the golf handicap smart web site server to communicate with a golf handicap smart card reader via any known interfacing protocol, to transfer data to a handicap smart card reader, and to receive data from a handicap smart card reader. The golf handicap web site application code carries out operations on data received and stored on the golf handicap web site database. These operations include organizing, maintaining, processing, and/or updating the golf handicap web site data received and/or stored on the golf handicap web site database.

Accordingly, it is a principal aspect of the invention to provide a golf handicap smart card system including at least one golf handicap smart card, at least one golf handicap smart card reader, and a golf handicap web site.

It is another aspect of the invention to provide a golf handicap smart card system that enables a qualified user to have a current verifiable golf handicap with them at all times and available for peer review.

It is an aspect of the invention to provide improved elements and arrangements thereof in a golf handicap smart card system for the purposes described which is inexpensive, mobile, dependable, and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
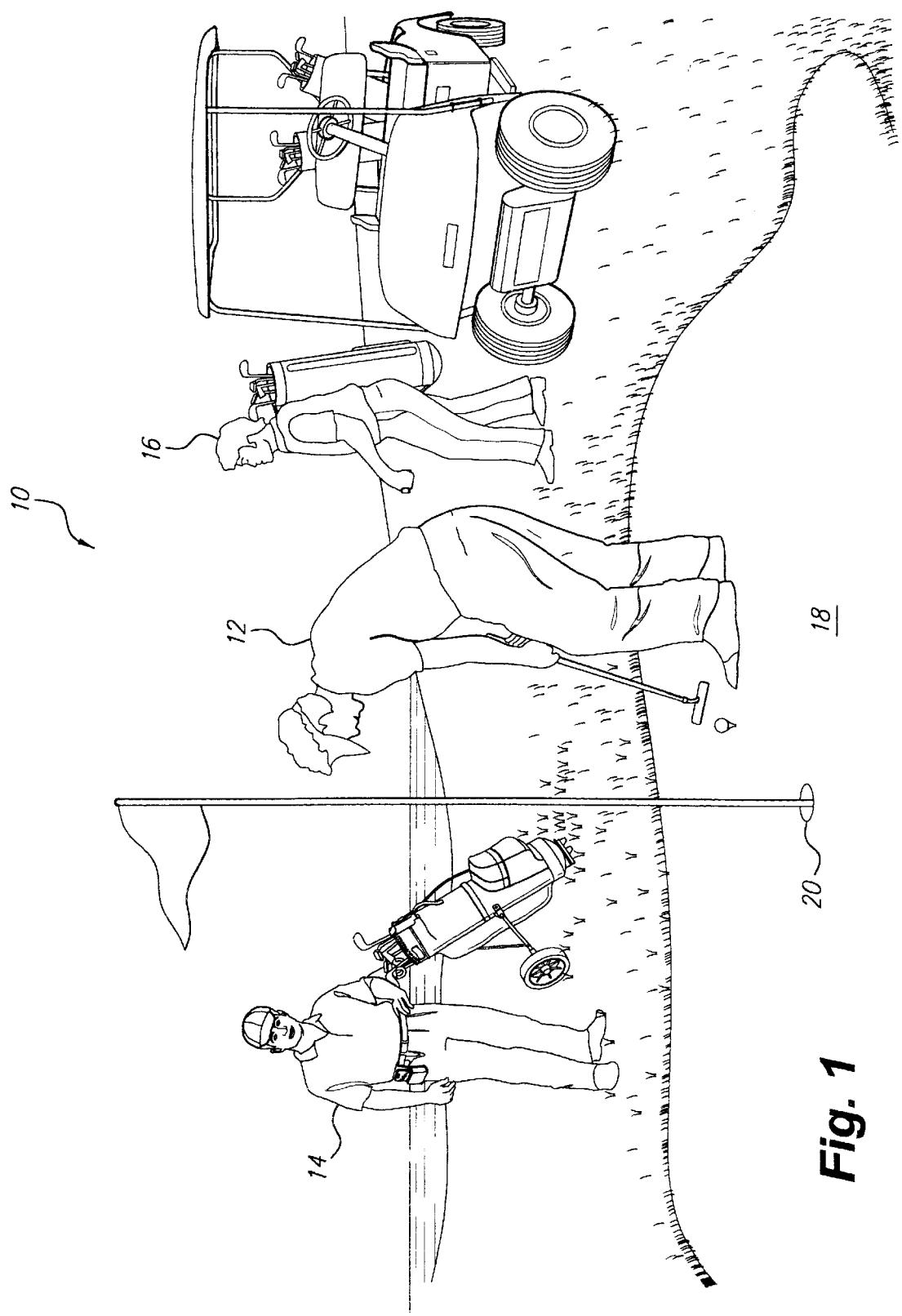
FIG. 1 is an environmental view of an individual making a golf shot at a golf hole on a golf course.

The present invention is a golf handicap smart card system. The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

Figure 2:
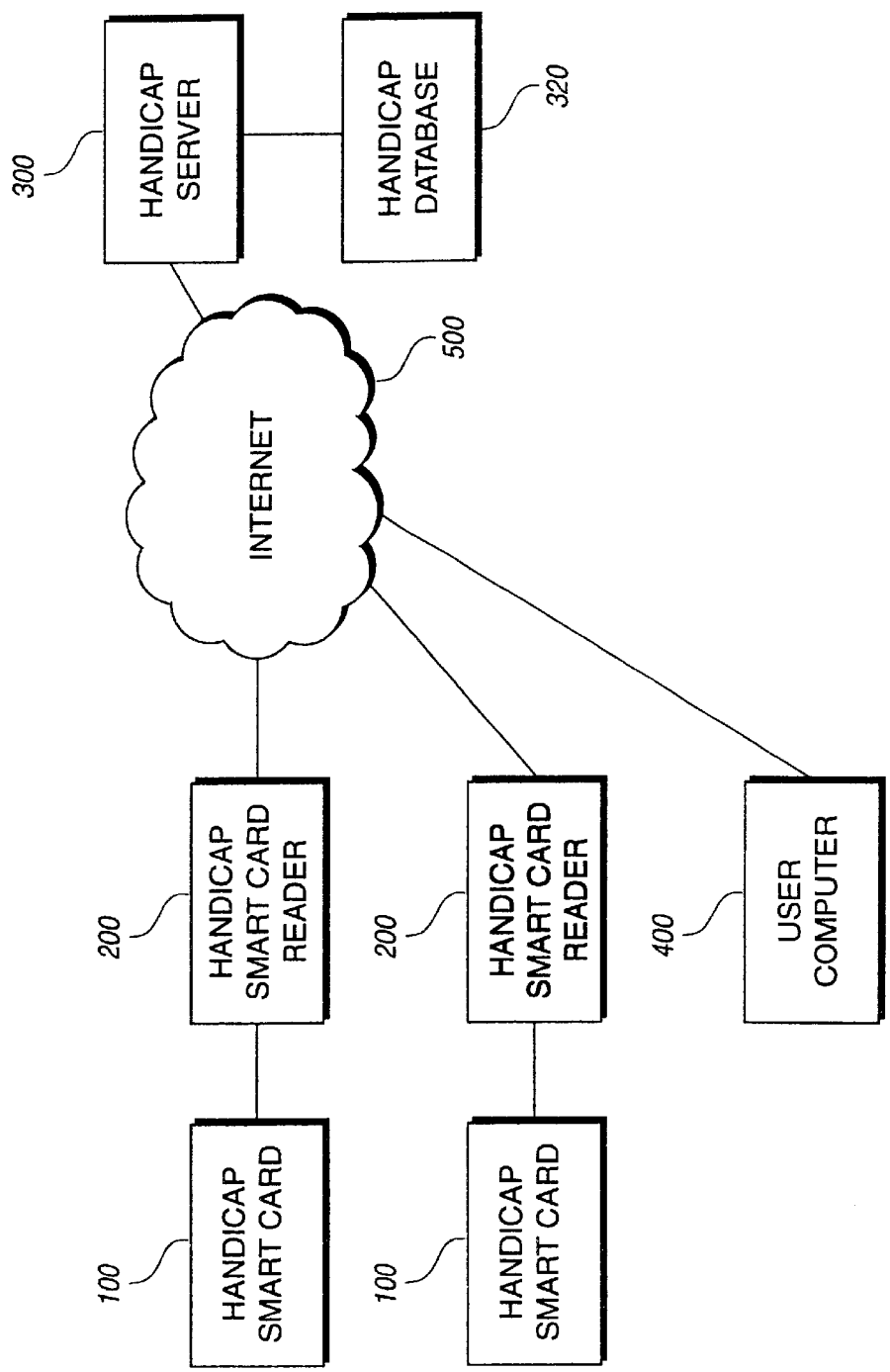
FIG. 2 is a block diagram of a golf handicap smart card system according to the present invention.

FIG. 1 illustrates a scene 10 where a group of golfers 12, 14, and 16 are playing a round of golf at a golf club course. Golfer 12 is attempting to put a shot on green 18 to hole 20. Each of these golfers 12, 14, and 16 has a golf handicap smart card according to the present invention. FIG. 2 illustrates a block diagram of the golf handicap smart card system. The golf handicap smart card system includes at least one golf handicap smart card 100, at least one golf handicap smart card reader 200, and at least one golf handicap server 300 that manages a golf handicap web site using a golf handicap database 320. The golf handicap readers 200 and the golf handicap server 300 are linked together via the Internet 500. In addition, access to the golf handicap server 300 may be achieved through one or more user computers 400.

The Internet 500 links together a variety of computers from around the world (e.g. the World Wide Web) and various topics in a non-sequential web of associations which permit a user to browse from one topic to another, regardless of the format and order of topics. Users may access and browse the Web using a web browser that generally resides and is executed on the user's computer 400. The web browser allows a user to retrieve and render hyper-media content from the network of computers within the web, including text, sound, video and other types of data. These hyper-media contents are stored on different web sites.

Web sites are locations on server computers that are accessible through the Internet. A variety of information, such as hyper-media contents and databases can be stored on a web site and can be accessed by users with computers connected to the Internet 500. One of the applications of the Web is its capability to link a web site with a database so users can search for information. To serve up pages, web sites need a server (a host computer) and server software that runs on the server. The host computer manages the communication protocols and houses the pages and related software required to create a web site on the Internet. Host computers spread throughout the Internet can house different web sites.

As illustrated in FIG. 2, the golf handicap smart card system includes a golf handicap server 300 linked to a golf handicap database 320. The golf handicap web site has a unique location so that a user computer can locate and retrieve information and web pages from the handicap web site. The unique identifier for the golf handicap server 300 is called the Internet Protocol (IP) address and the unique identifier for the golf handicap web site is called the Uniform Resource Locator (URL). The URL indicates where the golf handicap server is located, the location of the golf handicap web site on the golf handicap server 300, and the name of the web page and the file type of each document among other information.

The golf handicap smart card system includes at least one golf handicap smart card 100. The golf handicap smart card 100 is a plastic card embedded with a computer chip that calculates, stores personal information and past history, and transacts data between the golf handicap smart card 100 and golf handicap smart card readers 200. This data is associated with either value or information or both and is stored and processed within the golf handicap smart card's chip.

Figure 3:
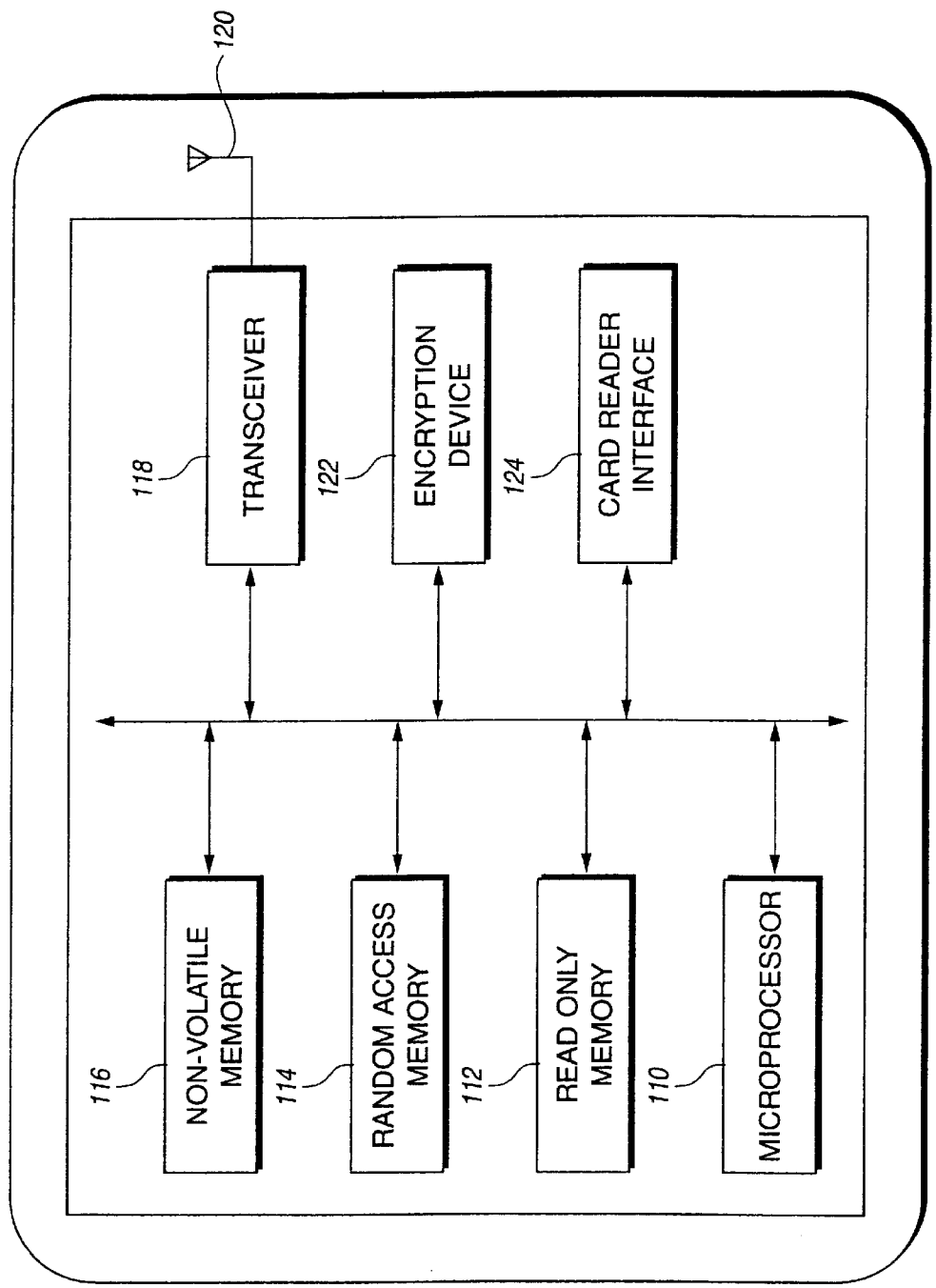
FIG. 3 is a block diagram of a golf handicap smart card according to the present invention.

The golf handicap smart card 100 may be a contact card, a combination card, or a contactless card. As illustrated in FIG. 3, these cards may include a microprocessor 110, a read only memory 112, a random access memory 114, a non-volatile memory 116, and a card reader interface 124. A combination or contactless card may also include a transceiver and an antenna 120 to enable transfer of data via a wireless link. These cards may also include an encryption methodology device 122 to provide security to the data on the card.

The golf handicap smart card 100 has on-card dynamic data processing capabilities and allocates the card memories 112, 114, and 116 into independent sections assigned to a specific function or application. Application programs/logic manage the memory allocation and file access. The application programs/logic manage data in organized file structures via card software. The application programs/logic control access to the memories 112, 114, and 116. This capability permits different and multiple functions and/or different application programs/logic to reside on the golf handicap smart card 100.

The golf handicap smart card reader 200 is a self-contained processing device/application. The golf handicap smart card reader 200 may read and write to the golf handicap smart card 100. The golf handicap smart card reader 200 may include memory and a microprocessor to store application logic or programs. The golf handicap smart card reader 200 may interface to the golf handicap web site/database via any known technique, such as via an RS232 serial port, a universal serial bus port, a PCMCIA slot, a parallel port, an infrared IRDA port, or the like. The golf handicap smart card reader 200 may include a modem to provide communication with the golf handicap web site over the Internet via a telephone line. The golf handicap smart card reader 200 may have input keys or buttons to enable a user to input information. The golf handicap smart card reader 200 may also include a display, such as a cathode ray tube display, a liquid crystal display, a light emitting diode display, a plasma display, a plasma addressing liquid crystal display, a thin film transistor display, a field emission display, or the like, to enable a user to observe information that is being read or written to a golf handicap smart card 100.

The golf handicap smart card reader 200 may have a printer to print out a paper that includes the golfer's name, the current USGA handicap index, the conversion from the index to the handicap for that individual golf course, and the appropriate set of tees. The printer may also print out a paper that includes all rounds of golf stored on the golf handicap smart card 100. The memory of the golf handicap smart card reader 200 will include information applicable to the particular course where the golf handicap smart card reader 200 is currently located. The information may include the required slope and course rating for all sets of tees. Appropriate information may be input or loaded when a golf handicap smart card reader 200 is initially delivered to a course.

The golf handicap smart card 100, the golf handicap smart card reader 200, and the golf handicap web site each include respective software code stored in their respective memories. More particularly, the golf handicap smart card 100 includes golf handicap smart card software code stored in the golf handicap smart card 100 memory, the golf handicap smart card reader 200 includes golf handicap smart card reader software code stored in the golf handicap smart card reader 200 memory, and the golf handicap web site includes golf handicap web site software code stored in the golf handicap web site server 300.

The golf handicap smart card software code includes golf handicap smart card application programs/logic code. The golf handicap smart card application programs/logic code enables the golf handicap smart card 100 to communicate with a golf handicap smart card reader 200 via any known interfacing protocol, and to transfer data to a handicap smart card reader 200, and to receive data from a handicap smart card reader 200. The golf handicap smart card application programs/logic code carries out operations on data received and stored on the golf handicap smart card. These operations include utilizing stored USGA handicap algorithms to calculate a current handicap based on data received and/or stored on the golf handicap smart card 100.

The golf handicap smart card reader software code includes golf handicap smart card reader application code. The golf handicap smart card reader application code enables the golf handicap smart card reader 200 to communicate with a golf handicap smart card 100 via any known interfacing protocol, to transfer data to a handicap smart card 100, to receive data from a handicap smart card 100, to communicate with the golf handicap web site, to transfer data to the handicap web site, and to receive data from the handicap web site. The golf handicap smart card reader application code carries out operations on data received and stored on the golf handicap smart card reader.

The golf handicap web site software code includes golf handicap web site application code. The golf handicap web site application code enables the golf handicap smart web site server 300 to communicate with a golf handicap smart card reader 200 via any known interfacing protocol, to transfer data to a handicap smart card reader 200, and to receive data from a handicap smart card reader 200. The golf handicap web site application code carries out operations on data received and/or stored on the golf handicap web site database 320. These operations include organizing, maintaining, processing, and updating the golf handicap web site data received and/or stored on the golf handicap web site database 320.

Prior to playing their round of golf, the golfers 12, 14, and 16 will have registered at the golf club. Upon registration the individual golfer's golf handicap smart cart 100 will be given to an authorized club operator. The club operator will swipe or insert the golfer's golf handicap smart card 100 into a golf handicap card reader 200. The club operator may inquire about the particular type of tees the golfer will be using that day. The golf handicap smart card reader 200 may be provided with course identification, course slope, the course index, and other course specific information when the smart card reader is initially delivered to the course or when changes to the course occur. The golf operator will input the information obtained from the golfer into the golf handicap smart card reader 200 via input keys or the like and the course information will automatically be transferred to the golf handicap smart card. The handicap card reader 200 will update the golf handicap smart card 100 with this information along with the current date.

Once the golf game is over, the golfers 12, 14, and 16 will return to the club operator and give the operator their respective score cards and their golf handicap smart cards 100. The club operator will swipe or insert the golf handicap smart cards 100 into the golf handicap smart card reader 200. The respective individual round's information will be saved to the golf handicap smart card reader 200 memory and the respective individual golf handicap smart card's 100 memory. At a predetermined time during the evening, a club operator will activate the golf handicap smart card reader 200 to dial up the golf handicap web site server 300 and upload the day's scores to the golf handicap smart card database 320.

If one of the individual golfers fails to submit his or her score to a club operator, the next time that particular golfer attempts to register at any participating golf club, the golf handicap smart card reader 200 will automatically prompt the club operator to enter the missing score. The golfer will need to provide to the club operator what the missing score was, as all of the other information has already been recorded from the previous check-in (e.g., course ID, slope rating, date, etc.).

If the golfer needs to fix an erroneous previous score, the golfer will bring their score card to a club operator and the club operator will use an administrative view of the data on the card, select the erroneous round on the smart card 100 and then type over the correct score or tee position. This record will be included in the previously described nightly upload process and recorded as a correction in the handicap database 320. If scores have not been uploaded from the previous day, the golf handicap smart card reader 200 will not start up at that particular golf club to encourage the golf club to connect the handicap card reader 200 to a phone line and upload the scores to the handicap database 320.

The golf handicap smart card system is a win for all participants, the golfer, the participating private and public golf clubs, and the USGA. The golfer wins because he or she has a handicap that is valid daily, and can be taken anywhere and can be considered valid because the peer review has been established at the time of the posting and updating to the golf handicap smart card 100 and the golf handicap smart card web site database 320. Additional peer review may be available at the golf handicap web site. The golf handicap smart card system allows a public golfer or a golfer that is not affiliated with any public or private club to have a valid handicap that can stand under the peer review scrutiny that the USGA requires. The interaction aspect of the golf handicap web site allows a golfer to track his or her progress.

The golf handicap smart card system will benefit individual public or private golf clubs because it will allow the golf clubs more flexibility in how they administer all the programs at their clubs. The handicap chairperson may perform administrative reviews from the comfort of their home since the handicaps of all golfers are on an accessible handicap web site. Handicaps for tournaments such as member guests can be checked at the last possible date since the golfer's handicap indexes are updated daily. The golf handicap web site allows authorized club operators to set up a tournament away from the club. The use of formulas from the golf handicap web site allows for the authorized club operator to work at home or a remote site away from the pro shop. The golf handicap smart card system is especially beneficial to the public or semi-private golf clubs because it allows the public clubs a service that is not available at this time. Most public golf courses do not have any way for a public golfer to establish a handicap.

The second advantage for the golf clubs is that the golfers will return to the golf handicap smart card reader to post scores. Most golfers do not return to a club operator after a round is completed. The golf handicap smart card system requires golfers to promptly post their scores. As golf handicap smart card readers may be placed in a pro shop or the like, the golf handicap smart card system will allow a golf facility an opportunity for additional business. The printer of the golf handicap smart card reader will print out an updated handicap index with a comment regarding the use of the USGA score formula (and possibly exceptional round information). If the golfer has an exceptionally good score the printer can have a coupon offer. If the score is not good, the attendant can ask the golfer if a new putter is needed. Either way the club has an opportunity for additional business.

The golf handicap smart card system also has substantial benefit for the USGA. The trend from private to public golf rounds has led to the use of the Internet to maintain a golfer's individual handicap or have no handicap at all. The integrity of the game, which the USGA has protected so well for so many years, is being challenged. Internet handicaps can be made up and unverifiable scores can be entered because there is really no peer review. The problem of no verifiable handicap is really unacceptable. The USGA needs to have a handicap system that all golfers can use with confidence as the game of golf shifts from private to public course play.

While the invention has been described with references to its preferred embodiment, it will be understood by those skilled in the art that various changes may be made and equivalents may be substituted for elements thereof without departing from the true spirit and scope of the invention.

We claim:

1. A golf handicap smart card system comprising:
   at least one golf handicap smart card, each golf handicap smart card having memory with handicap algorithms stored therein, and a microprocessor to calculate a current golf course handicap based on the stored handicap algorithms and data received/stored on the associated golf handicap smart card;
   at least one golf handicap smart card reader, each golf handicap smart card reader having golf course information and individual rounds played for a predetermined golf course; and
   a golf handicap web site accessible by qualified users, whereby a qualified user has a current calculated verifiable golf course handicap at all times for a specific golf course based on handicap information calculated and maintained on one of the at least one golf handicap smart card.

2. A golf handicap smart card system according to claim 1, wherein said memory includes golf handicap smart card software code stored therein.

3. A golf handicap smart card method according to claim 2, wherein said golf handicap smart card software code includes golf handicap smart card application programs/logic code.

4. The golf handicap smart card system according to claim 1, wherein said memory includes a read only memory, a random access memory, and a nonvolatile memory.

5. The golf handicap smart card system according to claim 1, wherein said golf handicap smart card further includes a card reader interface.

6. The golf handicap smart card system according to claim 1, wherein said golf handicap smart card further includes a transceiver and an antenna.

7. The golf handicap smart card system according to claim 1, wherein said golf handicap smart card is a contact card.

8. The golf handicap smart card system according to claim 1, wherein said golf handicap smart card is a combination card.

9. The golf handicap smart card system according to claim 1, wherein said golf handicap smart card is a contactless card.

10. The golf handicap smart card system according to claim 1, wherein said microprocessor is configured to read and write data to said golf handicap smart card.

11. The golf handicap smart card system according to claim 10, wherein said golf handicap smart card reader is a self-contained application device.

12. A golf handicap smart card system according to claim 10, wherein said memory includes golf handicap smart card reader software code stored therein.

13. A golf handicap smart card method according to claim 12, wherein said golf handicap smart card reader software code includes golf handicap smart card application code.

14. The golf handicap smart card system according to claim 10, wherein said golf handicap smart card reader includes a modem to provide communication with said golf handicap web site.

15. The golf handicap smart card system according to claim 10, wherein said golf handicap smart card reader includes input keys or buttons to enable a user to input information.

16. The golf handicap smart card system according to claim 10, wherein said golf handicap smart card reader includes a display.

17. The golf handicap smart card system according to claim 10, wherein said display is selected from the group consisting of a cathode ray tube display, a liquid crystal display, a light emitting diode display, a plasma display, a plasma addressing liquid crystal display, a thin film transistor display, and a field emission display.

18. The golf handicap smart card system according to claim 10, wherein said golf handicap smart card reader includes a printer.

19. The golf handicap smart card system according to claim 1, wherein said golf handicap web site includes a server and a database.

20. A golf handicap smart card system according to claim 19, wherein said server includes golf handicap web site software code stored therein.

21. A golf handicap smart card method according to claim 20, wherein said golf handicap web site software code includes golf handicap web site application code.

22. A golf handicap smart card method comprising:
providing at least one golf handicap smart card, each golf handicap smart card having memory with handicap algorithms stored therein, and a microprocessor to calculate a current golf course handicap based on the stored handicap algorithms and data received/stored on the associated golf handicap smart card;
providing at least one golf handicap smart card reader, each golf handicap smart card reader having golf course information and individual rounds played for a predetermined golf course; and
providing a golf handicap web site accessible by qualified users,
calculating and storing data between on one of the at least one golf handicap smart card and transferring data to one of the at least one golf handicap smart card reader for storage;
transferring data between the one of the at least one golf handicap smart card reader and the golf handicap web site;
calculating a verifiable current golf course handicap on one of the at least one golf handicap smart card based on stored handicap algorithms and data received/stored on the one of the at least one golf handicap smart card;
providing a qualified user with the calculated verifiable golf course handicap derived for a specific golf course based on handicap information calculated and maintained on the one of the at least one golf handicap smart card.

23. A golf handicap smart card method according to claim 22, wherein said step of providing at least one golf handicap smart card further comprises storing golf handicap smart card software code in the golf handicap smart card memory.

24. A golf handicap smart card method according to claim 23, further comprising providing said golf handicap smart card software code with golf handicap smart card application program/logic code.

25. A golf handicap smart card method according to claim 22, wherein said step of providing at least one golf handicap smart card reader further comprises providing said at least one golf handicap golf card reader with memory and storing golf handicap smart card reader software code in the golf handicap smart card reader memory.

26. A golf handicap smart card method according to claim 25, further comprising providing said golf handicap smart card reader software code with golf handicap smart card reader application code.

27. A golf handicap smart card method according to claim 22, wherein said step of providing at least one golf handicap web site further comprises providing said at least one golf handicap web site with a server and a database and storing golf handicap web site software code in the golf handicap web site server.

28. A golf handicap smart card method according to claim 27, further comprising providing said golf handicap web site software code with golf handicap web site application code.

* * * * *